United States Patent
Welker et al.

(10) Patent No.: US 8,717,844 B2
(45) Date of Patent: May 6, 2014

(54) SEISMIC DATA ACQUISITION USING SELF-PROPELLED UNDERWATER VEHICLES

(75) Inventors: Kenneth E. Welker, Nesoya (NO); Julian Edward (Ed) Kragh, Finchingfield (GB)

(73) Assignee: WesternGeco L.L.C., Houston, TX (US)

( * ) Notice: Subject to any disclaimer, the term of this patent is extended or adjusted under 35 U.S.C. 154(b) by 611 days.

(21) Appl. No.: 12/880,445

(22) Filed: Sep. 13, 2010

(65) Prior Publication Data
US 2011/0266086 A1   Nov. 3, 2011

Related U.S. Application Data

(60) Provisional application No. 61/307,153, filed on Feb. 23, 2010.

(51) Int. Cl.
*G01V 1/38* (2006.01)

(52) U.S. Cl.
USPC .......... 367/16; 367/15; 367/17; 181/122

(58) Field of Classification Search
USPC ....... 73/769; 114/293; 181/110; 363/85, 128, 363/160; 367/15, 16, 21, 38, 159; 440/9, 440/13; 702/6, 14, 16, 18
See application file for complete search history.

(56) References Cited

U.S. PATENT DOCUMENTS

| | | | |
|---|---|---|---|
| 986,627 A | 3/1911 | Fisher | |
| 1,315,267 A | 9/1919 | White | |
| 2,520,804 A | 8/1950 | Hollar | |
| 3,312,186 A | 4/1967 | Litsheim | |
| 3,453,981 A | 7/1969 | Gause | |
| 3,508,516 A | 4/1970 | Root | |
| 3,845,733 A | 11/1974 | Jackman | |
| 3,872,819 A | 3/1975 | Pickens | |
| 3,928,967 A | 12/1975 | Salter | |

(Continued)

FOREIGN PATENT DOCUMENTS

| | | | |
|---|---|---|---|
| WO | 8704401 A1 | 7/1987 | |
| WO | 9410029 A1 | 5/1994 | |
| WO | WO 0181168 A1 * | 11/2001 | ............... B63G 8/00 |

OTHER PUBLICATIONS

Amundsen et al., "Seismic Imaging Technology," GEO EXPRO Newsletter, Nov. 2008: pp. 1-5, <http://www.geoexpro.com/geoexpro/recent_advances/seismic_im1/>.

(Continued)

*Primary Examiner* — Isam Alsomiri
*Assistant Examiner* — Daniel L Murphy

(57) ABSTRACT

The present disclosure generally relates to the use of a self-propelled underwater vehicle for seismic data acquisition. The self-propelled underwater vehicle is adapted to gather seismic data from the seafloor and transmit such data to a control vessel. The self-propelled underwater vehicle may be redeployed to several seafloor locations during a seismic survey. Methods for real-time modeling of a target zone and redeployment of the self-propelled underwater vehicle based on the modeling are also described.

19 Claims, 6 Drawing Sheets

(56) References Cited

U.S. PATENT DOCUMENTS

| | | | |
|---|---|---|---|
| 4,332,571 | A | 6/1982 | Jakobsen |
| 4,371,347 | A | 2/1983 | Jakobsen |
| 4,389,843 | A | 6/1983 | Lamberti |
| 4,598,547 | A | 7/1986 | Danihel |
| 4,684,350 | A | 8/1987 | DeLima |
| 4,842,560 | A | 6/1989 | Lee |
| 4,968,273 | A | 11/1990 | Momot |
| 5,084,630 | A | 1/1992 | Azimi |
| 5,577,942 | A | 11/1996 | Juselis |
| 5,757,722 | A | 5/1998 | Zinn |
| 5,930,731 | A * | 7/1999 | Brzostowski ............ 702/18 |
| 5,995,882 | A | 11/1999 | Patterson et al. |
| 6,099,368 | A | 8/2000 | Gorshkov |
| 6,561,856 | B1 | 5/2003 | Gorshkov |
| 6,951,138 | B1 * | 10/2005 | Jones ............ 73/769 |
| 6,975,560 | B2 | 12/2005 | Berg et al. |
| 7,016,260 | B2 * | 3/2006 | Bary ............ 367/15 |
| 7,187,569 | B2 * | 3/2007 | Sinha et al. ............ 363/160 |
| 7,371,136 | B2 | 5/2008 | Hine et al. |
| 7,512,036 | B2 | 3/2009 | Crowell |
| 7,632,043 | B2 | 12/2009 | Thompson et al. |
| 7,636,275 | B2 * | 12/2009 | Anno et al. ............ 367/21 |
| 7,796,466 | B2 | 9/2010 | Combee et al. |
| 2003/0220027 | A1 | 11/2003 | Gorshkov |
| 2004/0102107 | A1 | 5/2004 | Gorshkov |
| 2007/0173141 | A1 * | 7/2007 | Hine et al. ............ 440/13 |
| 2009/0147619 | A1 | 6/2009 | Welker |

OTHER PUBLICATIONS

Anderson et al., "Autonomous Nodes for Time Lapse Reservoir Seismic: An Alternative to Permanent Seabed Arrays," PESA News, Jun./Jul. 2009: p. 52-54.

Anonymous, "Underwater laser pops in navy ops," BBC News, Sep. 2009: pp. 1-2, <http://news.bbc.co.uk/1/hi/8243503.stm.>.

Gosling, "Breakthrough Ocean Sensor Grid Technology by GO Science Offers Low Cost, High Fidelity Seismic & CSEM Surveys," GO Science, 2007: p. 1.

Gosling, "RHyVAU Indago AGV Brochure," GO Science, 2007: pp. 1-2.

Gosling, "RHyVAU Brochure," GO Science, 2008: pp. 1-2.

Gosling, "uRaptor Brochure," GO Science, 2007: p. 1.

International Search Report and Written Opinion of PCT Application No. PCT/US2011/025282 dated Sep. 30, 2011: pp. 1-8.

Maxwell et al., "OTC Paper 18992: A New Ocean Bottom Seismic Node System," 2007 Offshore Technology Conference, Apr.-May 2007: pp. 1-8.

Rainville et al., "Wirewalker: An Autonomous Wave-Powered Vertical Profiler," Journal of Atmospheric and Oceanic Technology, Jun. 2001, vol. 18: pp. 1048-1051.

Vasilescu, "Using Light Underwater: Devices, Algorithms and Systems for Maritime Persistent Surveillance," MIT Department of Electrical Engineering and Computer Science, 2009: pp. 1-219, <http://iuliu.com/pub/iuliu-vasilescu-phd-eecs-2009.pdf>.

* cited by examiner

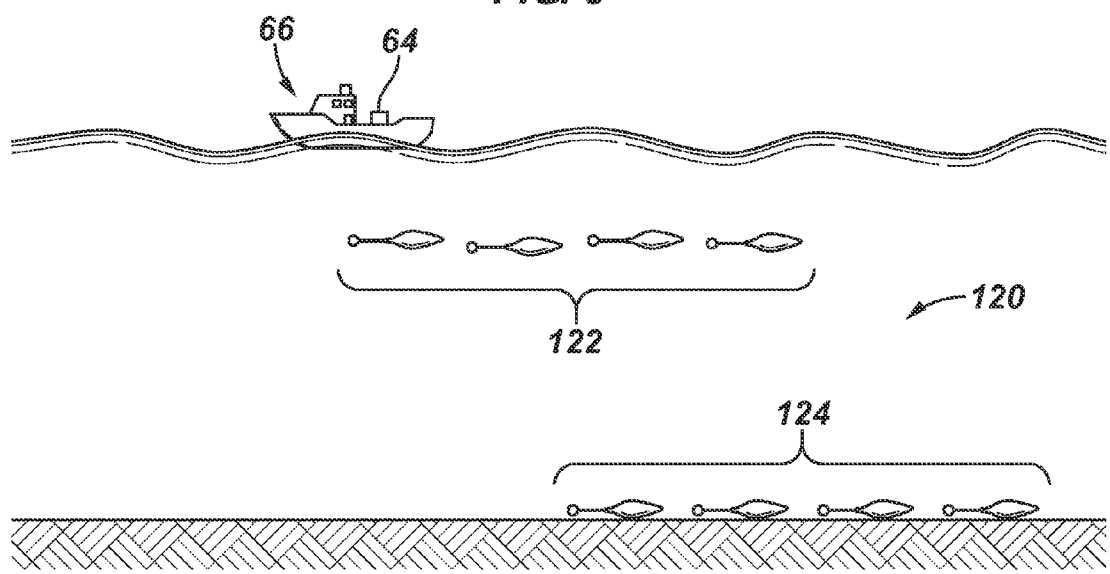

SEISMIC DATA ACQUISITION USING SELF-PROPELLED UNDERWATER VEHICLES

CROSS-REFERENCE TO RELATED APPLICATIONS

This application claims the benefit of U.S. Provisional Patent Application No. 61/307,153, filed Feb. 23, 2010.

BACKGROUND

Seismic exploration involves surveying subterranean geological formations for hydrocarbon deposits. A seismic survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy only one type of sensors or both. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. One type of marine survey, called a "seabed" survey, involves the deployment of seismic sensors, either cables or nodes on the seafloor. Seabed nodes may include both hydrophones and/or geophones for use in acquiring seismic data. Conventional seabed surveys typically involve the use of a deployment vessel from which seismic sensors are dropped to the seafloor and may be positioned with a remote operating vehicle (ROV). Deployment is especially difficult in deep water where currents can cause units dropped at the sea surface to travel horizontally and away from the desired location. After deployment, the node positions must be accurately determined before a source vessel passes over the seabed sensors. The source vessel then generates seismic waves, which in turn generate data captured by the sensors on the seafloor. Once a particular region is surveyed, the nodes must be retrieved, the recorded data extracted, and redeployed by the deployment vessel. Conventional seabed surveys are thus inefficient due to the time it takes to deploy, position and retrieve the ocean bottom nodes and to download the data captured by the nodes.

SUMMARY

This disclosure generally relates to seafloor acquisition of seismic data, and more particularly to the use of a self-propelled underwater vehicle to assist in the acquisition of such data. A recently developed self-propelled underwater vehicle, referred to herein as a sub-surface glider, is now widely used in oceanographic data collection. Such devices rise and fall in the water column with efficiency, taking advantage of the pressure and temperature differentials available in the water column. The self-propelled underwater vehicle, according to the present disclosure, may be used to acquire seismic data and then to transmit such data to a surface control unit, which may conduct further processing of the data. The surface control unit may be associated with any flotation element, such as a surface vessel, a buoy, or other autonomous sea surface vehicle, such as a wave glider on the sea surface. Wave gliders are similar in some respects to sub-surface gliders that travel through the water column in that they harvest energy from their environment, both solar and wave, and communicate via satellite with remote sites, such as a mother vessel. The gliders are different, however, in that the sub-surface glider requires vertical travel in the water column while the wave glider remains on the sea surface. Sub-surface and wave gliders can be used together to conduct seabed type surveys with far greater efficiency than today's conventional types of surveys. Additional types of surface control units are contemplated. For example, while some types of wave gliders rely on self propulsion, any sea surface vehicle, either propelled by the mechanical method peculiar to the wave glider or propelled by a more conventional method, such as by a propeller driven by a combustion or electrical engine, may be used as a surface control unit in coordination with a sub surface glider.

Sub-surface gliders that include seismic geophones and/or other seismic sensors and adequate data storage media can swim in order to reposition themselves from one survey line position to the next as directed by the vehicle control unit. As the source vessel traverses down a line, those sub-surface gliders (or "nodes") that are no longer within the planned offset position with respect to the source can move to the next source line acquisition position while the source vessel continues along its planned trajectory. At the end of the line, the last nodes swim into position during the vessel line change and are ready for the next acquisition. In addition, as sub-surface gliders need to ascend in the water column in order to fully realize the pressure and temperature gradients that make their lateral motion possible, they can come within range of the wave gliders and be positioned acoustically relative to the wave gliders. In turn, the wave gliders may contain GNSS type antennas and receivers that give their position in an earth centered earth fixed (ECEF) reference frame such as WGS-84. The sub-surface gliders are equipped with a vehicle control unit that communicates with a surface controller. Control critical information such as location of surface unit, location of source vessel, vehicle health checks, and survey plan updates, can be exchanged between the surface unit controller and vehicle unit controller to coordinate the survey in an efficient manner. When the sub-surface gliders are within range of the wave gliders, seismic recording data downloading can be performed. This data may be stored in the wave glider for download when retrieved by the mother vessel, or transmitted via satellite link to the mother vessel for near real time processing.

Additional embodiments are disclosed, such as the use of the wave gliders in performing efficient retrieval of the self-propelled underwater vehicles. The wave gliders may include net-like devices that capture the self-propelled underwater vehicles for retrieval purposes.

Still further, the self-propelled underwater vehicles may be used for time lapse survey operations adjacent to a drilling rig, thus offering on demand seismic surveying without the danger that towed streamers present when towed adjacent to a drilling rig.

Advantages and other features of the present disclosure will become apparent from the following drawings, description and claims.

BRIEF DESCRIPTION OF THE DRAWING

FIG. 9 is a schematic illustration representing the deployment of a fleet of self-propelled underwater vehicles.

DETAILED DESCRIPTION

Figure 1:
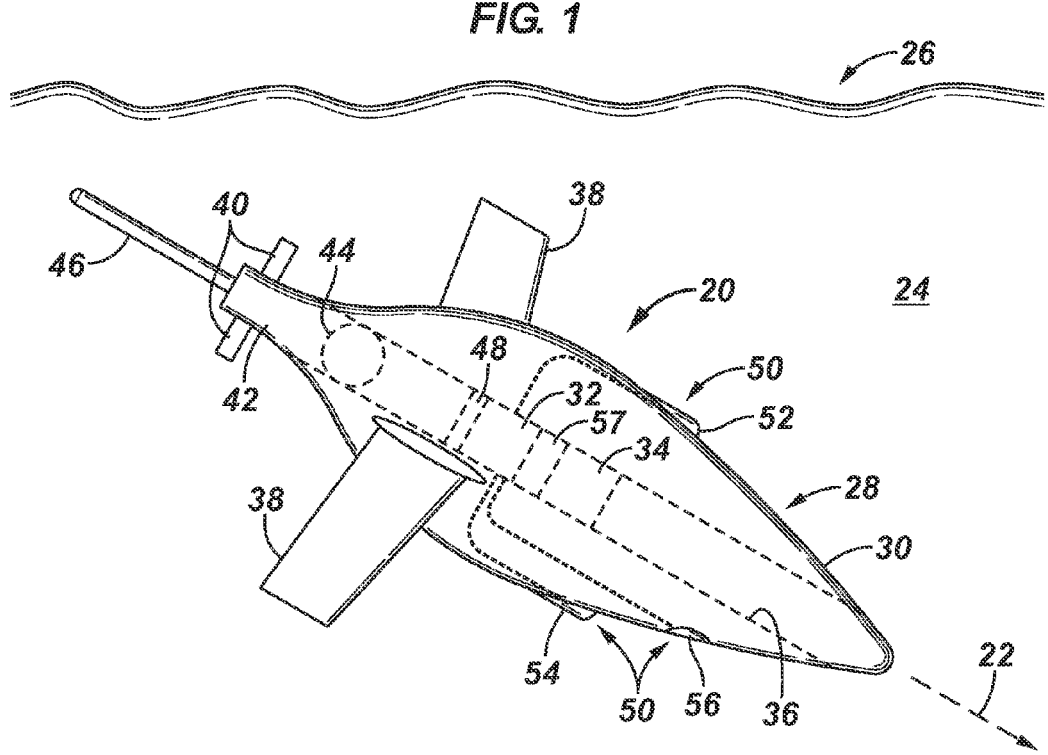
FIG. 1 is a schematic view of a self-propelled underwater vehicle deployed along a trajectory underwater to collect data, according to an embodiment of the present disclosure.

In the following description, numerous details are set forth to provide an understanding of the present invention. However, it will be understood by those of ordinary skill in the art that the present disclosure may be practiced without these details and that numerous variations or modifications from the described embodiments may be possible.

The present disclosure generally relates to a technique that can be used in seabed seismic data acquisition. The system and methodology utilize a self-propelled underwater vehicle (e.g., self-propelled or remotely controlled) to position seismic devices on the seafloor. The self-propelled vehicle includes seismic sensors (e.g., hydrophone, geophone, accelerometer and/or electromagnetic receiver) for detecting seismic signals reflected from subterranean structures. The self-propelled underwater vehicle is not physically coupled to any surface seismic vessels and moves independently underwater to desired regions of the seismic survey area. In some embodiments, the vehicle is connected to other vehicles via a cable such that several vehicles can cooperate to act as a seismic cable, either a seabed or towed cable. In combination with the self-propelled underwater vehicle, an autonomous sea surface vehicle may provide a near real time link to a mother vessel, and an acoustically determined distance from an ECEF reference frame. In some embodiments, the autonomous sea surface vehicle may be a wave glider, such as described in U.S. Pat. No. 7,371,136, which is incorporated herein by reference. In near real time, the position of the self-propelled underwater vehicle can be determined and compared to the planned position for use in a control method such as a proportional-integral-derivative (PID) controller that corrects the trajectory of the self-propelled underwater vehicle in order to position it closer to the bottom coordinates planned for seismic acquisition.

The self-propelled underwater vehicle can be preprogrammed and/or programmed during operation to follow desired trajectories underwater. The underwater trajectories are selected to position the vehicle and accompanying seismic sensors optimally on the seafloor to achieve various seismic surveying objectives. These trajectories can be updated and adjusted in reference to the wave glider ECEF reference frame during operations. Data can be transferred from the self-propelled underwater vehicle to a desired collection location, e.g. to a processing/control system on a surface vessel, such as via a wave glider/satellite link. Similarly, data can be transferred from the surface vessel either directly or via a wave glider/satellite link to the self-propelled underwater vehicle. The transfer of data from the surface vessel to the self-propelled underwater vehicle may be used to iteratively program the self-propelled underwater vehicle to follow new paths through the water column to other survey regions. For example, based on seismic coverage plots, or near real time geophysical imaging, the self-propelled underwater vehicle may be iteratively programmed to continually reposition itself at different areas of the seafloor in order to fill gaps identified in the coverage or image analysis.

According to one embodiment, the self-propelled underwater vehicle is a sub-surface glider programmed to glide along desired trajectories. Another example of a self propelled underwater vehicle is the Sounding Oceanographic Lagrangrian Observer Thermal RECharging (SOLO-TREC) autonomous underwater vehicle. The SOLO-TREC uses a thermal recharging engine powered by the natural temperature differences found at different ocean depths. Sub-surface gliders differ from wave gliders in that sub-surface gliders are able to travel within the water column, whereas wave gliders are for sea surface use only. Individual sub-surface gliders or groups of sub-surface gliders can be deployed in a seismic survey area and programmed to position themselves on the seafloor. In some embodiments, data from the sub-surface gliders is collected during surfacing, and data may also be downloaded to the sub-surface glider during the same surfacing activity. In one embodiment, data is transmitted between the sub-surface glider and a surface vessel via a satellite communication system, such as the Iridium satellite system. One example of a suitable type of sub-surface glider is the "Seaglider" developed by the Applied Physics Laboratory-University of Washington in cooperation with the University of Washington School of Oceanography. In other embodiments, the sub-surface gliders remain underwater during communication with the processing/control system. Typically such sub surface self propelled devices are equipped with dead reckoning systems that combine information from velocity meters, such as Doppler shifted acoustics referenced to the sea bottom or water particles. Such dead reckoning systems measure heading, pitch and roll through integrated magneto-inductive compasses and inclinometers. The velocities in the instrument frame are converted to Cartesian velocities in the ECEF frame using a transformation computed from the sensor values of roll, pitch and heading. The ECEF velocities can then be integrated to compute bottom track position and compared to a desired trajectory.

In another embodiment, the sub-surface glider transmits data and other useful information such as health checks and coordinates acoustically or by physical coupling to a wave glider positioned on the sea surface. Subsequently the wave glider transmits such information to the processing/control vessel for analysis such as seismic survey coverage, geophysical imaging and vehicle diagnostics. The sub-surface glider can calibrate its inertial guidance system periodically by comparing its non wave glider computed coordinates with those computed with reference to a geometrically adequate set of wave gliders through acoustic distance measuring, typically referred to as long baseline positioning or lbl. Further, short, ultra short and super short baseline positioning methods (sbl, usbl, ssbl respectively) can also be employed to locate the sub-surface glider relative to one or more wave gliders.

By way of example, the positioning trajectory selected for the sub-surface glider may be determined from a Global Navigation Satellite System (GNSS) (e.g., Global Positioning System (GPS) owned and operated by the U.S. Department of Defense) with a determined starting point and by dead reckoning, inertial navigation measurements, altimeters, compasses, and with a surface survey vessel or wave glider platforms for performing acoustic methods, such as lbl and sbl measurement methods, or any combination of such methods. In an alternate embodiment, communications also can be achieved through underwater acoustic and/or optical telemetry to either the survey vessel or wave glider. Obtaining a position for the sub-surface glider through active or passive acoustic distance measurement and subsequent communication to the sub-surface glider allows an operator on the surface survey vessel to control the trajectory of the sub-surface glider. The history of descent or ascent enables an operator to download information regarding an updated desired path for the sub-surface glider. The process of updating the sub-surface glider path also can be automated according to specific objectives for changing the glider trajectory. For example, objectives for changing the glider trajectory may include avoiding obstructions and other vehicles, e.g. surface vessels, which may be moving through the survey area during a scheduled surfacing of the glider.

Referring generally to FIG. 1, a self-propelled underwater vehicle 20 is illustrated according to an embodiment of the present disclosure. In this embodiment, vehicle 20 is illustrated as following a desired trajectory 22 through a water column 24 of a seismic survey area 26. Although self-propelled underwater vehicle 20 may be designed in a variety of configurations, one example is the illustrated glider 28 that can be programmed to glide along the desired trajectory 22.

In the embodiment illustrated, the self-propelled underwater vehicle 20, e.g. sub-surface glider, comprises an outer shell or hull 30 that is hydrodynamically designed to have a low coefficient of drag as the vehicle moves through the water. The self-propelled underwater vehicle 20 also may comprise a control unit 32, such as a processor based control system, powered by a suitable battery 34. By way of example, battery 34 may comprise a battery pack movable along an internal structure 36 to adjust the balance/inclination of the self-propelled underwater vehicle 20. Additionally, wings 38 are mounted to extend from shell 30 in a manner that helps control the gliding of vehicle 20 along trajectory 22. A plurality of stabilizer fins 40 may be attached to a tail section 42 of shell 30 to further stabilize the movement of vehicle 20 along desired trajectories 22. Additionally, further control over self-propelled underwater vehicle 20 can be achieved by selectively inflating and deflating a bladder 44 to change the buoyancy of vehicle 20. The bladder 44 may be inflated, for example, to cause vehicle 20 to surface for transmission of data to or from a surface vessel, a wave glider or other surface platform.

Transmission of data from self-propelled underwater vehicle 20 to a surface location, e.g. a surface vessel or wave glider, and transmission of data to vehicle 20 can be accomplished via an antenna 46 coupled to a suitable transceiver 48 which, in turn, is connected to control unit 32. By way of example, antenna 46 may be mounted to extend from tail section 42. Accordingly, when bladder 44 is inflated to cause vehicle 20 to surface, antenna 46 extends above the water line to facilitate transmission of data. It should be noted, however, that underwater data transmission techniques also can be utilized. Additionally, control unit 32 can be designed to exercise automatic control over the movement of vehicle 20. In other applications, a PID controller or other suitable controller is used to position the vehicle 20 at multiple locations for gathering seismic data.

The vehicle 20 further includes sensors 50 useful for acquiring seismic data in marine environments such as at the seabed. The sensors 50 are coupled to the control unit 32. In one embodiment, the sensors 50 include one or more seismic sensors, such as hydrophones 54 and/or particle motions sensors (e.g., accelerometers) 56. In some embodiments, the sensors 50 may include electromagnetic sensors or combinations of seismic and electromagnetic sensors. The sensors 50 are able to record pressure and shear wave data at the seabed to thus facilitate the mapping and analysis of subsea hydrocarbon deposits.

The self-propelled underwater vehicle is optimally designed to couple the seismic sensor 50 to the sea floor and locate other seismic sensors optimally to record the seismic source signal in either the pressure wave, shear wave, or particle motion domain. Such optimization aims to isolate the signal from other sources of pressure waves, shear waves or particle motion.

The vehicle 20 is equipped with a clock 57 that can be calibrated through various methods of communication. Clock calibration facilitates keeping the recording and source events synchronized, thus enabling the migration of travel times to depth via sound velocity models. In one embodiment, the vehicle 20 surfaces and receives GPS satellite signals (e.g., from satellite communication system 68 in FIG. 3) that contain time information. These are compared to the vehicle's local clock and the local clock is calibrated to the GPS time. The same satellite time is recorded at a source vessel (e.g., surface vessel 66 in FIG. 3) and a record of the time difference is maintained to allow for clock drift models. These models are then applied to the recorded data in order that the differences between clocks in the recording vehicle and source vessel are accounted for. In an alternate embodiment, clock calibration is achieved by sending a time stamped message of the clock time to the vehicle 20 from the source vessel, wave glider, or other surface platform acoustically or by other methods such as with a light source, e.g. lasers.

Figure 2:
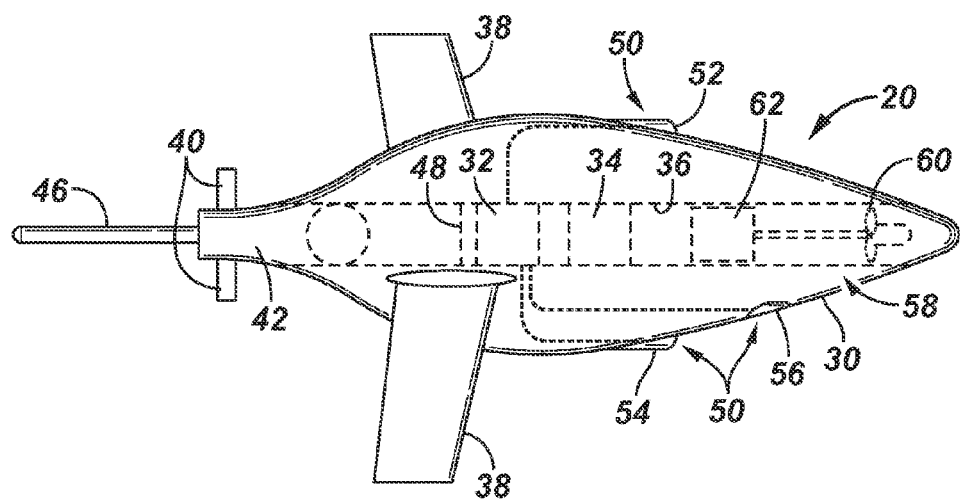
FIG. 2 is a schematic view of another example of a self-propelled underwater vehicle, according to an alternate embodiment of the present disclosure.

The self-propelled underwater vehicle 20 may have a variety of other configurations and incorporate additional or alternate components. In FIG. 2, for example, an alternate embodiment of self-propelled underwater vehicle 20 is illustrated with a charging system 58 designed to enhance the life of battery 34. In this example, an impeller 60 is coupled to a generator 62 to charge battery 34. As self-propelled underwater vehicle 20 descends along a desired trajectory 22, water flows through impeller 60 to rotate the impeller and power generator 62. The generator 62 outputs current to battery 34 to charge the battery for longer battery life during operation of the various systems on self-propelled underwater vehicle 20. However, charging system 58 also facilitates the use of battery 34 to power an optional propulsion system that can be used to move vehicle 20 through water column 24.

Additional electrical power generation mechanisms may also be incorporated into the self-propelled underwater vehicle 20 and surface platform such as those described in U.S. Patent Publication No. 2009/0147619, which is incorporated herein by reference. Power generated by this method can be used for charging the battery 34 in the self-propelled underwater vehicle 20. Power uses include radio and satellite communications systems as well as acoustic ranging systems.

Figure 3:
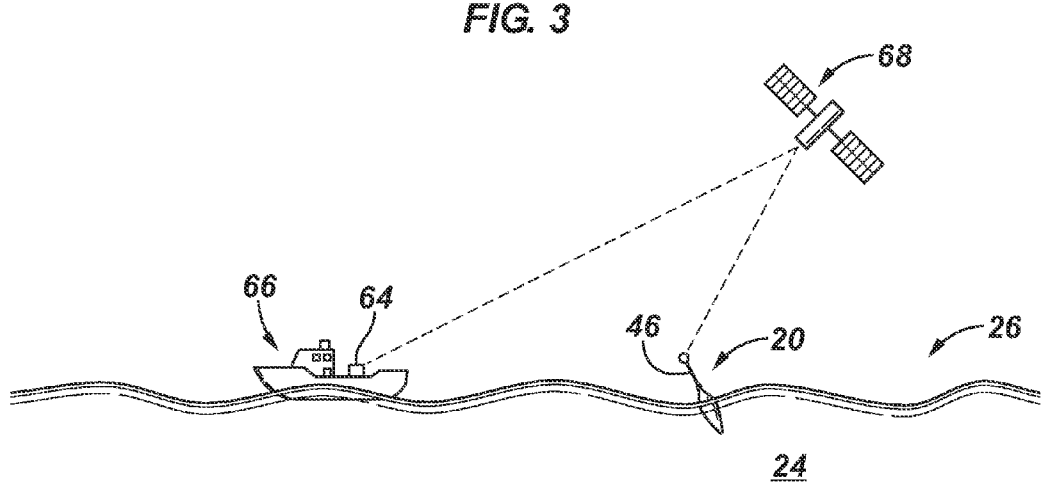
FIG. 3 is a schematic illustration representing the transfer of data between the self-propelled underwater vehicle and a surface vessel, according to an embodiment of the present disclosure.

As illustrated in FIG. 3, self-propelled underwater vehicle 20 can be designed to communicate with a surface control unit 64 located on, for example, a surface vessel 66. Surface vessel 66 may comprise one of the seismic survey vessels or an independent vessel for use in obtaining data from vehicle 20 and for controlling the movement of vehicle 20 through water column 24. In the embodiment illustrated, self-propelled underwater vehicle 20 communicates with surface control unit 64 via a satellite communication system 68. As described above, the bladder 44 may be inflated to increase the buoyancy of vehicle 20 and to move the vehicle to the surface such that antenna 46 extends through the surface of the water, as illustrated.

Figure 4A:
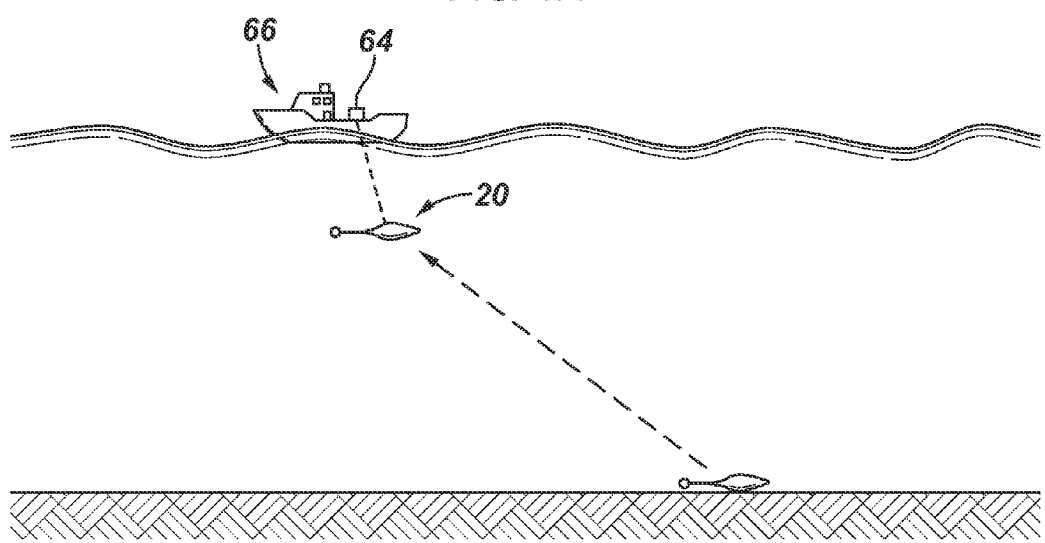
FIG. 4A is a schematic illustration representing the transfer of data between the self-propelled underwater vehicle and a surface vessel, according to another embodiment of the present disclosure.
Figure 4B:
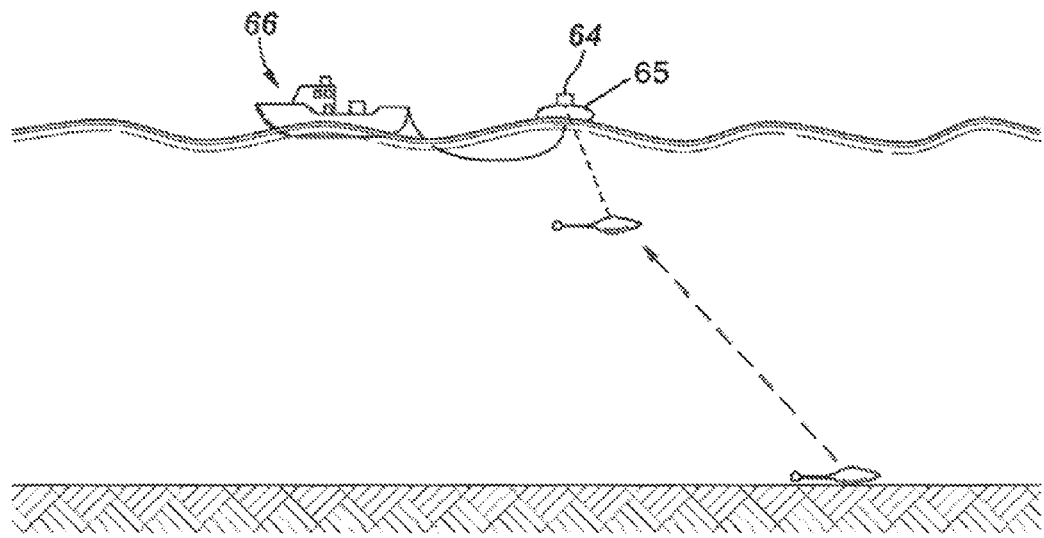
FIG. 4B is a schematic illustration representing the transfer of data between the self-propelled underwater vehicle and a surface vessel, according to another embodiment of the present disclosure.
Figure 4C:
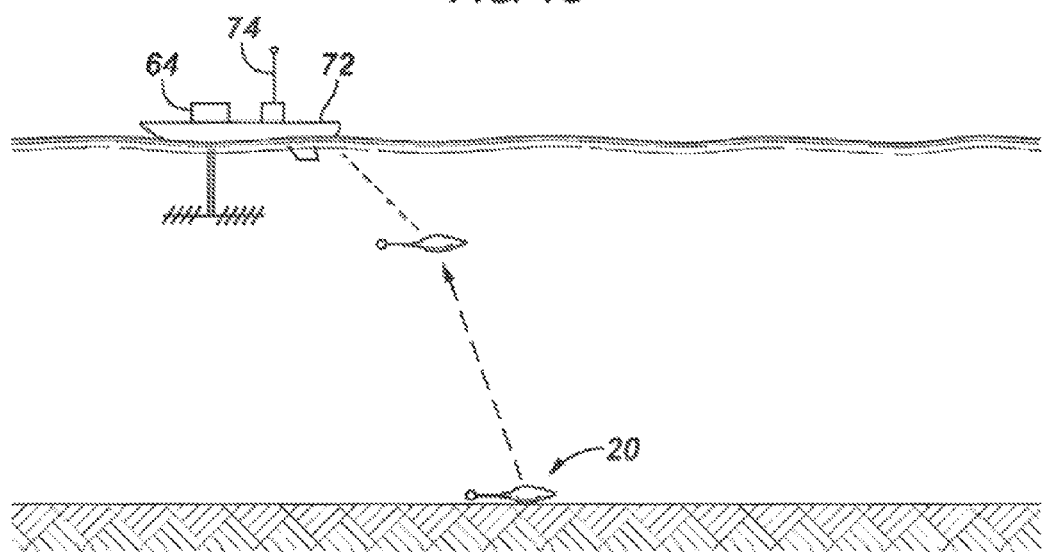
FIG. 4C is a schematic illustration representing the transfer of data between the self-propelled underwater vehicle and a wave glider, according to another embodiment of the present disclosure.

In other embodiments, as illustrated in FIG. 4A, the self-propelled underwater vehicle 20 need not surface to communicate with a surface vessel 66 or other surface platform. Rather, the vehicle 20 may ascend to a position proximate the surface platform, yet still underwater, and communicate with the surface control unit 64, for example via light or acoustic communication. In an alternative embodiment, as illustrated in FIG. 4B, the surface control unit 64 may be disposed on a float 65 associated with the surface vessel 66. In still further embodiments, as illustrated in FIG. 4C, the surface control unit 64 may be disposed on a wave glider 72. It is to be appreciated that the surface control unit 64 may be associated with any flotation element. Such an arrangement provides flexibility in transferring data from the vehicles 20 as the wave glider 72 or other surface float 65 (or other flotation element) may be closer to certain vehicles 20 deployed throughout the survey area. Several such wave gliders 72 or other surface floats 65 having surface control units 64 may be deployed throughout the survey region. Indeed, the wave gliders 72 may not be operatively connected to the surface vessel 66, but rather function as autonomous buoys at strategic locations throughout the survey area. The wave gliders 72 may include an antenna 74 for data transmission. In embodiments where multiple surface control units 64 are deployed, the surface control unit 64 on the vessel may function as the master surface control unit such that it receives data from and transmits data to the deployed surface control units. Towed float communication may occur through tail buoys at the end of towed streamers if the survey methods combine towed streamer technology with bottom nodes. Alternatively, the towed source can also be equipped with a communications device on the source float. Both of these platforms may be already equipped with a communications line back to the towing vessel.

Figure 5:
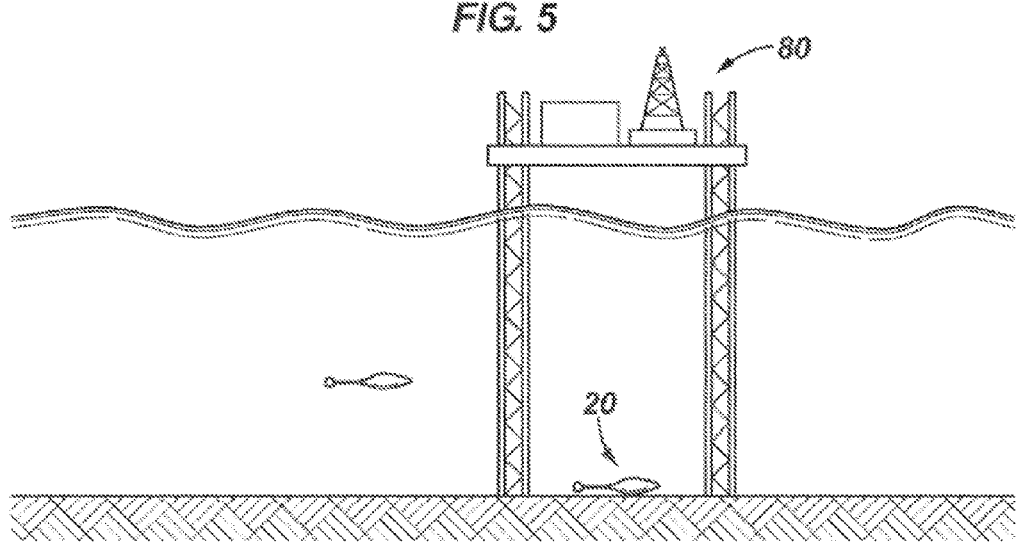
FIG. 5 is a schematic illustration representing the use of the self-propelled underwater vehicle to conduct a time lapse survey adjacent to a drilling rig.

In still further embodiments, as illustrated in FIG. 5, the self-propelled underwater vehicles 20 may conduct a time lapse monitor survey around a drilling rig or near a production reservoir. The vehicles 20 can be deployed from the rig whenever a 4D type of monitor survey is conducted. The vehicles 20 can be positioned as described above for larger surveys or can be positioned relative to the rig or rigs via long baseline or short baseline types of acoustic methods. In such embodiments, the positioning acoustic devices may be located on the rig or rigs. The acoustic devices are referenced to an ECEF reference frame established onboard the rig by, for example, a GNSS receiver antenna and positioning system. The vehicles 20 may seek to occupy the positions they had during the base survey or other past surveys in order to reduce the normalized root mean squared (nrms) noise that can occur due to changes in azimuth and offset of the energy through a non homogeneous overburden region. With the vehicles 20 located in the same positions as the previous or base survey, a source vessel (not depicted) can position the center of the source in the same positions occupied during the base survey such that any difference measured by analyzing (differencing) the two survey records can be attributed to changes in the reservoir and overburden as a result of production rather than from changes in the source and receiver locations.

In some embodiments, the self-propelled underwater vehicles 20 may be stored on or near the rig as part of a suite of source and receivers easily deployable for reservoir monitoring whenever recent seismic survey data is needed for production decisions. This enables the production team to conduct a local seismic survey on demand with reduced operational effort. Processing of the data and image interpretation may also be performed locally on the rig. A further advantage to this type of survey system is that the self-propelled underwater vehicles 20 may be deployed close to and/or directly under the rig with reduced risk of accident as no vessel is required to retrieve the vehicles 20. Rather, the self-propelled underwater vehicles 20 can travel away from the rig or towards the location where they will be retrieved. For example, in some embodiments, the vehicles 20 may travel to a water surface location adjacent the rig for safe retrieval.

Figure 6:
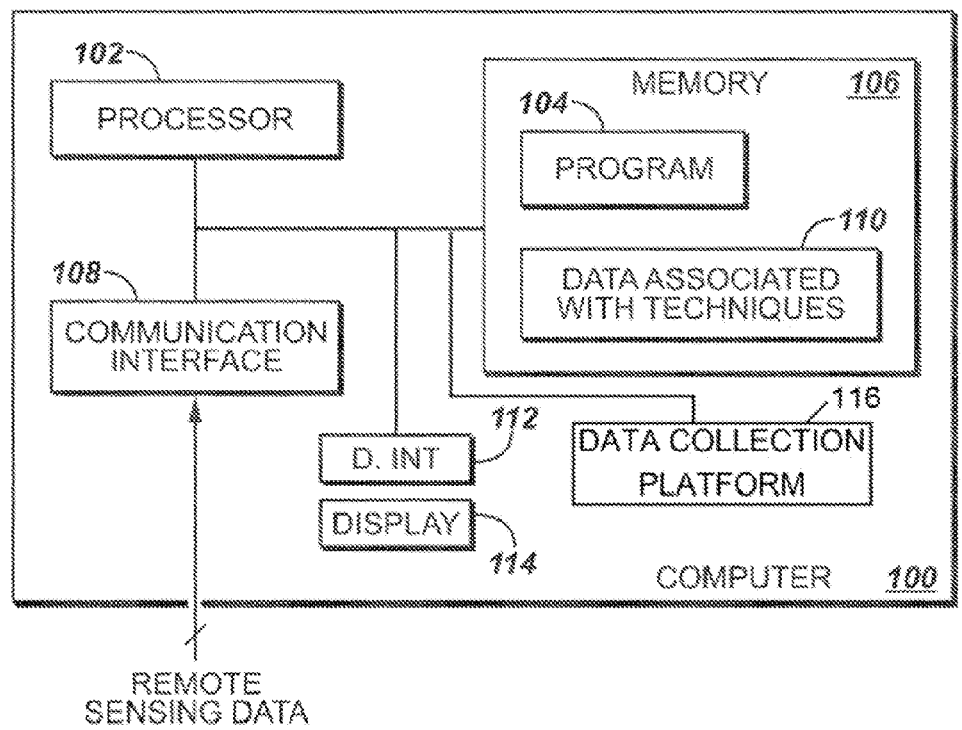
FIG. 6 is a schematic diagram of a data processing system for carrying out processing techniques according to the present disclosure.

Referring to FIG. 6, in some embodiments, the surface control unit 64 and/or the vehicle control unit 32 may take the form of a data processing system 100 that includes a processor 102 constructed to execute at least one program 104 (stored in a memory 106) for purposes of processing data to perform one or more of the techniques that are disclosed herein (e.g., processing the seismic data received from the vehicles 20 or identifying and issuing positioning commands to the vehicles 20 with respect to the surface control units 64 and processing data, such as positioning commands, received from the surface control units 64 with respect to the vehicle control units 32). The processor 102 may be coupled to a communication interface 108 for purposes of receiving and transmitting data at the surface control unit 64 and/or vehicle control unit 32. In addition to storing instructions for the program 104, the memory 106 may store preliminary, intermediate and final datasets involved in the techniques (data associated with techniques 110) that are disclosed herein. Among its other features, the data processing system 100 may include a display interface 112 and display 114 for purposes of displaying the various data that is generated as described herein. The data processing system 100 may further include a data collection platform 116 (e.g, a database) configured to receive and store data from the vehicles 20 and/or surface control units 64.

It is to be appreciated that communication between the underwater vehicle 20 and the surface control unit 64 may be one-way or two-way. That is, the vehicle 20 may transmit recorded seismic data to the surface control unit 64 for additional processing and/or storage. The surface control unit 64 may transmit positioning commands to the vehicle 20 in order to direct the vehicle 20 to its next location (e.g., seafloor position). Of course, embodiments are contemplated in which only one-way communication takes place. For example, the vehicle 20 may be provided with sufficient data storage such that data transmission to the surface control unit 64 during deployment is unnecessary. In such scenarios, the vehicle 20 would only receive communication from the surface control unit 64. Providing the vehicles 20 with data storage capacity allows the vehicles 20 to obtain seismic data at one region of the seafloor and be repositioned to other regions of the seafloor for additional data gathering prior to surfacing.

In some embodiments, the vehicle 20 may be used with permanent seafloor nodes such that the vehicle 20 collects seismic data from the nodes and delivers the data to the surface control unit 64 either at the sea surface or from underwater.

The self-propelled underwater vehicle 20 also can be moved to the surface to facilitate retrieval. Retrieval may be accomplished by monitoring movement of vehicle 20 with onboard positioning systems, as described above. Additionally, or in the alternative, the vehicle 20 can utilize the satellite communication system 68 to send a GNSS fix via satellite after surfacing. A homing beacon signal system also can be incorporated into the vehicle 20 and the homing beacon signal can be used as a primary or backup locator. In addition to being a locator, the relationship can be reversed so the retrieval platform emits a homing beacon signal to bring the self-propelled underwater vehicle 20 home. This allows the retrieval platform to continue with its primary mission profile until the self-propelled underwater vehicle is close enough to be retrieved.

In some embodiments, retrieval may be facilitated by gathering the vehicles 20 into a certain area using homing devices installed in the vehicles. By congregating the vehicles 20 into a strategically convenient area, a surface vessel may retrieve many such vehicles in a quick manner. Alternatively, the vehicles 20 can communicate with each other via satellite, conveying their surface coordinates to a central controller (e.g., on vessel 66) that computes the optimum point for retrieval based on factors such as retrieval vessel location and the geometric center for some number of units to be retrieved. The central controller then transmits the best retrieval point determined by an optimization algorithm back to the individual units via satellite. Such an algorithm may attempt to limit the distance the vessel will have to transit to retrieve the seismic recording units. Other inputs to the optimization algorithm may be seismic survey lines yet to be completed, turn radius of the vessel and others.

Figure 7:
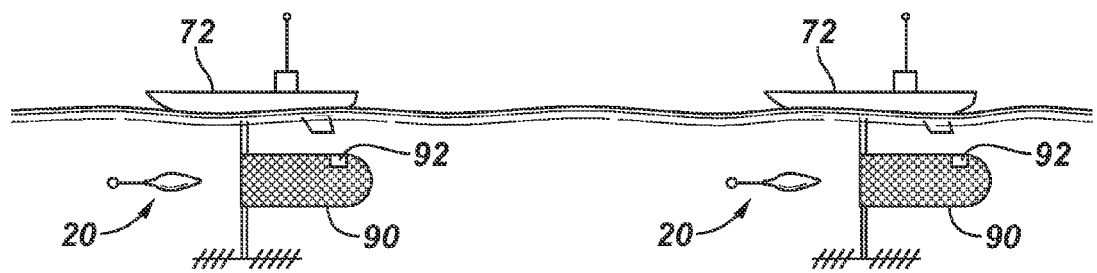
FIG. 7 is a schematic diagram illustrating one embodiment of a method for retrieving the self-propelled underwater vehicles using wave gliders.

In still other embodiments, with reference to FIG. 7, the underwater vehicles 20 can be captured by the wave gliders 72 or other sea surface autonomous vehicle in a net-like device 90 extending from the wave gliders. As the underwater vehicles 20 and wave gliders 72 approach each other, their relative orientation can be determined so that the wave glider can open the mouth of the towed net-like device 90 that is hydrodynamically designed to open in the direction of the approaching sub-surface vehicle. After the underwater vehicle 20 has entered the net 90, a sensor 92 may detect its presence, thus signaling the net to close until the next sub-surface vehicle 20 approaches the wave glider 72. It is to be appreciated that the net-like device 90 may be disposed on the wave glider 72 in various manners. For example, the net-like device 90 may be disposed in or on the umbilical portion of the wave glider 72 and can be deployed during the retrieval process. In other embodiments, the net-like device 90 may hang from the fin portion of the wave glider 72.

Moreover, other surface platforms may be utilized in retrieving the underwater vehicles 20 using the net-like device 90 described herein. The collected sub-surface vehicles 20 may be towed back to the survey vessel 66 (FIG. 3), drilling rig (FIG. 5), or other location where they can be retrieved, where the acquired data can be downloaded, and where the vehicles may be maintained and stored until the next deployment.

Figure 8:
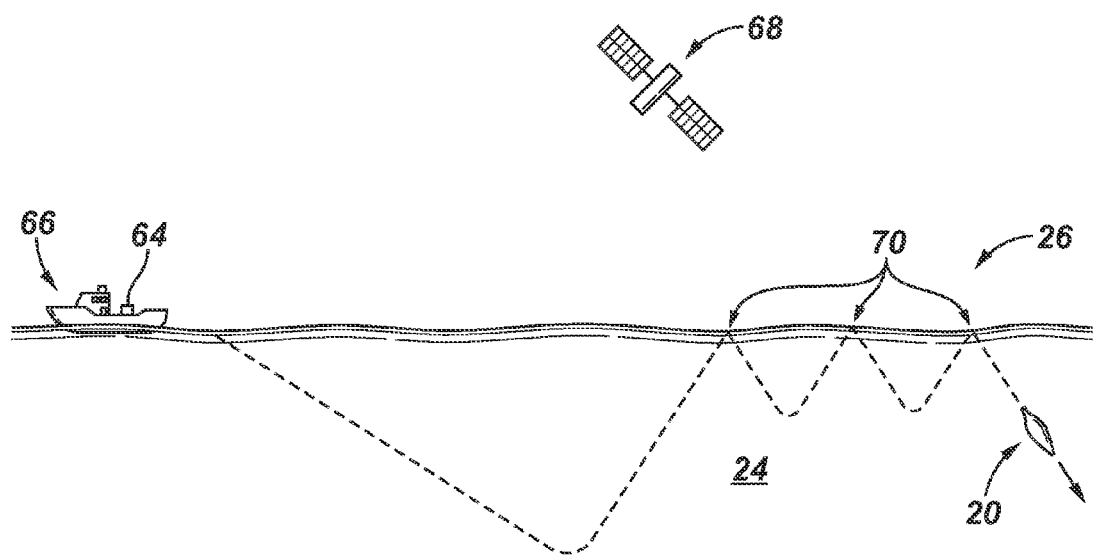
FIG. 8 is a schematic illustration representing ongoing adjustment to the trajectories traveled by the self-propelled underwater vehicle, according to an embodiment of the present disclosure.

In embodiments where satellite systems are used with the underwater vehicles 20, satellite communications system 68 or another suitable communication system may be used such that data can be repeatedly sent to self-propelled underwater vehicle to adjust the trajectory or trajectories of vehicle 20 during operation without retrieval of the vehicle, as illustrated in FIG. 8. For example, surface control unit 64 may be used in cooperation with communication system 68 to send new program instructions to self-propelled underwater vehicle 20 at each surfacing location 70. The updating of program instructions and the changes to trajectory can be conducted on an iterative basis to pursue different seafloor regions.

Alternatively, communications can be conducted through the wave glider 72 or other surface platform which communicates with the mother vessel via satellite or surface radio.

Tracking of the self-propelled underwater vehicle 20 by the surface vessel 66 or other surface platform can be achieved with various acoustic positioning systems, including lbl systems, sbl systems, usbl systems and other suitable systems. The trajectory of the vehicle 20 also may be transmitted back to the vessel during surface or underwater visits as described above. In the latter application, the trajectory can be determined by dead reckoning between GNSS fixes.

In some of these applications, and with reference again to FIG. 1, the processing system 32 of vehicle 20 can be used to compute the coordinates of the vehicle. For example, hydrophones 54 can be positioned on the self-propelled underwater vehicle 20 at specific geometries and separation distances to enable operation of a short baseline system or an ultra short baseline system type of positioning system. If the depth measurement is known, two or more hydrophones 54 can be used to enable determination of position. Otherwise, three or more hydrophones are positioned on vehicle 20 with sufficient separation to measure the phase difference between an acoustic wave transmitted by a transmitter on a home platform, such as a transmitter on surface vessel 66. If the acoustic signal has the ECEF or other reference frame coordinates of the transmitter modulated on it, the internal processing system 32 of the vehicle 20 can compute its own coordinates in the reference frame of the transmitters and compare them to the planned trajectory or final survey position coordinates in the same or other reference frame after the appropriate reference frame conversion. The coordinates can be stored and/or used in making steering decisions. For example, decisions can be made to steer toward the transmitter or to steer according to a planned trajectory.

In seabed applications, a relative positioning network can be built up on the survey area seafloor. Once any one vehicle 20 has an accurately determined position, it may remain at that point to serve as a control point. Other vehicles 20 can determine their position relative to the control points and dead reckon to their position. As the source/acquisition vessel passes over the newly assembled vehicles on the sea bottom, it can use one or more of the above mentioned acoustic positioning methods to determine a new set of control points. In addition, during data acquisition, methods can be used to position the nodes both with reference to the source and to each other. See, e.g., U.S. Pat. No. 5,757,722, which is incorporated herein by reference.

Referring to FIG. 9, the vehicles 20 may be grouped in an array or fleet 120 to carry out seismic data acquisition. For example, the vehicles 20 can be separated into one of two acquisition lines 122, 124, thus permitting one set to be sent for data download (either at the surface or underwater) while the other set(s) are being deployed for seismic data acquisition. Of course, the fleet could be made up of several acquisition lines depending on the size and scope of the survey. The fleet 120 may be programmed to respond to certain parameters. In one embodiment, the vehicles 20 may be pre-programmed to receive a message from the surface control unit 64 when the seismic mission has been completed. This message may be in the form of an acoustic signal transmitted from the vessel 66 or other transmitter associated with the survey. The message may be a dedicated message or, in some embodiments, it may be associated with a certain survey parameter, such as source strength, indicating the distance between the source and vehicle. In this example, the vehicles 20 may be programmed to discontinue survey efforts once the strength of the direct arrival or reflected source signal as measured by the vehicle falls below a certain threshold level. In other embodiments, the vehicle 20 may include a clock that has a specified time window for the survey.

During deployment of the fleet 120, the survey target zone may be analyzed through various onboard processes. For example, survey coverage may be tracked with conventional binning processes, which generally form a cell (bin) grid over the target zone. The bins may be populated with data acquired by the vehicle 20 when positioned on the seafloor. This active tracking of the target zone coverage could thus facilitate re-positioning of the vehicles 20 to areas where additional bin data coverage is needed. In other embodiments, a model of the target zone may have been created according to a previous survey. Accordingly, the model may be altered in the current survey by using real-time feedback from the vehicles 20. In this manner, target zone coverage can be assessed using a real-time updated model and thus the vehicles 20 can be repositioned according to any coverage holes identified.

Seismic data acquisition using the fleet 120 may be combined with other seismic data acquisition methods. In some embodiments, the acquisition cycle can include towed streamer acquisition simultaneous to seafloor node recording in order to integrate both datasets. As well as providing multi-component data, this dual acquisition scenario may have significant advantages for increasing the crossline sampling of the towed streamer data, improving the azimuthal coverage and enabling coverage where obstacles obscure the path of the vessel and streamers. Further to this, the vehicles 20 can record very low frequencies because of their ability to deghost the seismic signal through a combination of P+Vz and their location in a quiet low-noise seabed environment. In this manner, only sparse spatial sampling is required compared to the towed streamer acquisition in cases where processing of the low frequencies from the vehicles 20 takes place. Integration with the towed streamer data could then provide a considerably improved broadband data set. Another exploration application can be the inclusion of EM receiver antenna recording the signal of a source being towed by the master acquisition vessel.

While the present disclosure has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present disclosure.

What is claimed is:

1. A method for surveying subterranean formations, comprising:
    providing at least one self-propelled underwater vehicle, the vehicle having at least one sensor disposed therein;
    lowering the self-propelled underwater vehicle into the sea;
    deploying the self-propelled underwater vehicle to a first location on the seafloor to gather seismic data via the at least one sensor, the first location having a first depth;
    retrieving the seismic data from the self-propelled underwater vehicle while the self-propelled underwater vehicle remains in the sea at a second depth different from the first depth, below a surface of the sea and above the seafloor; and
    deploying, after the retrieving, the self-propelled underwater vehicle to a second location different from the first location and on the seafloor to further gather seismic data.

2. A method according to claim 1, wherein
    the at least one sensor comprises a seismic sensor, and
    the method further comprises gathering seismic data with the seismic sensor.

3. A method according to claim 2, wherein
    the seismic sensor comprises a hydrophone, a geophone or an accelerometer, and
    the method further comprises gathering seismic data with the hydrophone, geophone or accelerometer.

4. A method according to claim 1, wherein
    the at least one sensor comprises an electromagnetic sensor, and
    the method further comprises gathering seismic data with the electromagnetic sensor.

5. A method according to claim 1, wherein
    the self-propelled underwater vehicle comprises a control unit, and
    the method further comprises providing a surface control unit that communicates with the vehicle control unit.

6. A method according to claim 5, wherein deploying the self-propelled underwater vehicle to the first location comprises issuing positioning commands from the surface control unit to the vehicle control unit.

7. A method according to claim 1, wherein deploying the self-propelled underwater vehicle to the second location comprises issuing positioning commands from the surface control unit to the vehicle control unit.

8. A method according to claim 5, further comprising
    providing a control vessel that carries the surface control unit, wherein
    retrieving the seismic data comprises positioning the self-propelled underwater vehicle at an underwater location proximate to the control vessel.

9. A method according to claim 5, further comprising
    providing an autonomous sea surface vehicle that carries the surface control unit, wherein
    retrieving the seismic data comprises positioning the self-propelled underwater vehicle at an underwater location proximate to the autonomous sea surface vehicle.

10. A method according to claim 1, wherein providing at least one self-propelled underwater vehicle comprises providing a plurality of self-propelled underwater vehicles.

11. A method according to claim 10, further comprising redeploying the plurality of self-propelled underwater vehicles respectively to at least one additional location to gather seismic data.

12. A method according to claim 1, further comprising using the seismic data retrieved from the self-propelled underwater vehicle to update a model of the subterranean formation.

13. A method according to claim 12, wherein the second location is chosen based upon the revised model of the subterranean formation.

14. A method for performing real-time modeling of a subterranean formation, comprising:
    deploying at least one self-propelled underwater vehicle to a survey region on the seafloor, the self-propelled underwater vehicle having a sensor disposed therein;

gathering seismic data with the sensor when the self-propelled underwater vehicle is at a first depth;
retrieving the seismic data from the self-propelled underwater vehicle when the self-propelled underwater vehicle is at a second depth different from the first depth, the second depth being below a surface of the sea and above the seafloor;
deploying, after the retrieving, the self-propelled underwater vehicle to a second location different from the first location and on the seafloor to further gather seismic data; and
using the seismic data to update a model of the subterranean formation.

15. A method according to claim 14, wherein
the sensor comprises a seismic sensor, and
the method further comprises gathering seismic data with the seismic sensor.

16. A method according to claim 15, wherein
the seismic sensor comprises a hydrophone, a geophone or an accelerometer, and
the method further comprises gathering seismic data with the hydrophone, geophone or accelerometer.

17. A method according to claim 14, wherein
the sensor comprises an electromagnetic sensor, and
the method further comprises gathering seismic data with the electromagnetic sensor.

18. A method according to claim 14, wherein
a drilling rig or other semi permanent sea surface facility is associated with the subterranean formation, and
deploying at least one self-propelled underwater vehicle comprises deploying at least one self-propelled underwater vehicle from the drilling rig or other semi permanent sea surface facility.

19. A method according to claim 14, wherein
the model was created based on a first survey, and
deploying at least one self-propelled underwater vehicle occurs during a second survey, the second survey being separated in time from the first survey.

* * * * *